United States Patent
Xu

(10) Patent No.: US 12,219,593 B2
(45) Date of Patent: Feb. 4, 2025

(54) RESOURCE SCHEDULING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 480 days.

(21) Appl. No.: 17/234,965

(22) Filed: Apr. 20, 2021

(65) Prior Publication Data

US 2021/0243772 A1    Aug. 5, 2021

Related U.S. Application Data

(63) Continuation of application No. PCT/CN2018/122492, filed on Dec. 20, 2018.

(51) Int. Cl.
*H04W 72/543* (2023.01)
*H04W 24/04* (2009.01)
(Continued)

(52) U.S. Cl.
CPC ......... *H04W 72/543* (2023.01); *H04W 24/04* (2013.01); *H04W 72/1268* (2013.01);
(Continued)

(58) Field of Classification Search
CPC .................................................. H04W 72/543
See application file for complete search history.

(56) References Cited

U.S. PATENT DOCUMENTS

2009/0063692 A1\*  3/2009  Baek .................... H04L 47/824
                                                                 709/230
2015/0173084 A1   6/2015  Chou et al.
(Continued)

FOREIGN PATENT DOCUMENTS

CN          101516139 A       8/2009
CN          108347772 A       7/2018
(Continued)

OTHER PUBLICATIONS

WO, International Search Report, PCT/CN2018/122492, mailed Sep. 2, 2019, 29 pages.
(Continued)

*Primary Examiner* — Jason E Mattis
(74) *Attorney, Agent, or Firm* — BAYES PLLC

(57) ABSTRACT

Disclosed are a resource scheduling method, a terminal device, a network device, a computer storage medium, a chip, a computer-readable storage medium, a computer program product, and a computer program. The method includes obtaining first information; and determining a resource reservation and/or resource scheduling of a first network device on the basis of the first information, wherein the first information includes at least one of the following: service cycle, service type, service arrival window, average packet size, service transmission reserved time window length, time window cycle, service arrival time point and/or allowable error, successful transmission duration of service, and service priority.

16 Claims, 5 Drawing Sheets

(51) Int. Cl.
  *H04W 72/1268* (2023.01)
  *H04W 72/1273* (2023.01)
  *H04W 72/21* (2023.01)
  *H04W 72/23* (2023.01)
  *H04W 72/56* (2023.01)

(52) U.S. Cl.
  CPC ....... *H04W 72/1273* (2013.01); *H04W 72/21* (2023.01); *H04W 72/23* (2023.01); *H04W 72/56* (2023.01)

(56) References Cited

U.S. PATENT DOCUMENTS

| | | | | |
|---|---|---|---|---|
| 2019/0029057 | A1* | 1/2019 | Pan | H04W 76/10 |
| 2020/0107339 | A1* | 4/2020 | Prakash | H04W 72/535 |
| 2021/0243641 | A1* | 8/2021 | Gangakhedkar | H04W 28/24 |
| 2021/0274585 | A1* | 9/2021 | Yu | H04W 76/12 |
| 2022/0061063 | A1* | 2/2022 | Patel | H04W 56/001 |

FOREIGN PATENT DOCUMENTS

| | | |
|---|---|---|
| EP | 2693800 A1 | 2/2014 |
| WO | 2017192082 A1 | 11/2017 |
| WO | 2018059173 A1 | 4/2018 |
| WO | 2018094618 A1 | 5/2018 |
| WO | 2018130148 A1 | 7/2018 |
| WO | 2018218998 A1 | 12/2018 |

OTHER PUBLICATIONS

PCT Written Opinion of the International Searching Authority issued in corresponding International Application No. PCT/CN2018/122492, mailed Sep. 2, 2019, 9 pages.

First Office Action issued in corresponding Chinese application No. 202110655900.X, mailed Aug. 17, 2022.

First Office action issued in corresponding India Application No. 202117016115, mailed on Feb. 9, 2022, 6 pages.

Second Office Action issued in corresponding Chinese application No. 202110655900.X, mailed Nov. 4, 2022.

Second Office Action issued in corresponding European application No. 18943736.1, mailed Dec. 21, 2022.

Huawei et al., "User Plane Enhancement for Uplink Bearer Split", R2-151180, 3GPP TSG-RAN WG2 Meeting #89bis Bratislava, Slovakia, Apr. 20-24, 2015.

InterDigital, "Scheduling aspects of UL intra-UE prioritization", R2-1816778, 3GPP TSG-RAN WG2 Meeting #104 Spokane, U.S.A, Nov. 12-16, 2018.

Extended European Search Report issued in corresponding European Application No. 18943736.1, mailed on Oct. 6, 2021, 16 pages.

"3rd Generation Partnership Project; Technical Specification Group Services and System Aspects; Study on Communication for Automation in Vertical Domains (Release 16)", 3GPP TR 22.804 V16.0.0 (Jun. 2018), 189 pages.

"Scheduling Enhancements for TSN traffic", Agenda item: 11.7.2, Source: CMCC, 3GPP TSG-RAN WG2 #104, R2-1818122, Spokane, USA, Nov. 12-16, 2018, 7 pages.

"3rd Generation Partnership Project; Technical Specification Group Services and System Aspects; Study on enhancement of 5GS for Vertical and LAN Services (Release 16)", 3GPP TR 23.734 V16.0.0 (Dec. 2018), 107 pages.

"3rd Generation Partnership Project; Technical Specification Group Radio Access Network; Study on NR Industrial Internet of Things (IoT); (Release 16)", 3GPP TR 38.825 V16.0.0 (Mar. 2019), 32 pages.

"On prioritization between overlapping configured and dynamic grants", Agenda Item: 11.7.3, Source: Ericsson, 3GPP TSG-RAN WG2 #104 Tdoc R2-1817178, Spokane, USA, Nov. 12-16, 2018, 3 pages.

* cited by examiner

RESOURCE SCHEDULING METHOD, TERMINAL DEVICE, AND NETWORK DEVICE

CROSS-REFERENCE TO RELATED APPLICATIONS

This application is a continuation application of International Application No. PCT/CN2018/122492, entitled "RESOURCE SCHEDULING METHOD, TERMINAL DEVICE, AND NETWORK DEVICE" filed on Dec. 20, 2018, the entire contents of which are incorporated herein by reference.

BACKGROUND

The present disclosure relates to the field of information processing technologies, in particular to a resource scheduling method, terminal device, network device and computer storage medium, chip, computer readable storage medium, computer program product, and computer program.

According to service requirements in NR, there are three application scenarios, including eMBB (enhanced mobile broadband), mMTC (massive machine type communication), uRLLC (ultra-reliable and low-latency communication). In a Release 15 HRLLC topic, HRLLC considers and deals with high-reliable and low-latency communication services. In Rel-16, objects to be studied are expanded, and research on factory automation, transport industry, and electrical power distribution services are extended to topics of NR IIoT.

SUMMARY

Embodiments of the present disclosure provide a resource scheduling method, terminal device, network device and computer storage medium, chip, computer readable storage medium, computer program product, and computer program.

In a first aspect, the embodiments of the present disclosure provide a resource scheduling method, which is applied to a first network device, and the method includes: obtaining first information; and determining a resource reservation and/or resource scheduling of the first network device based on the first information, wherein the first information includes at least one of the following: a service cycle, a service type, a service arrival window, an average packet size, a service transmission reserved time window length, a time window cycle, a service arrival time point and/or allowable error, a successful transmission duration of service, and a service priority.

In a second aspect, the embodiments of the present disclosure provide a resource scheduling method, which is applied to a second network device, and the method includes: sending first information to a first network device; and/or, sending the first information to a terminal device; wherein the first information is used for determining a resource reservation and/or resource scheduling of the first network device, and the first information includes at least one of the following: a service cycle, a service type, a service arrival window, an average packet size, a service transmission reserved time window length, a time window cycle, a service arrival time point and/or allowable error, a successful transmission duration of service, and a service priority.

In a third aspect, the embodiments of the present disclosure provide a resource scheduling method, which is applied to a terminal device, and the method includes: receiving first information from a second network device; and determining a resource reservation and/or resource scheduling of the first network device based on the first information; wherein the first information includes at least one of the following: a service cycle, a service type, a service arrival window, an average packet size, a service transmission reserved time window length, a time window cycle, a service arrival time point and/or allowable error, a successful transmission duration of service, and a service priority.

In a fourth aspect, the embodiments of the present disclosure provide a first network device, including: a first processing unit that obtains first information, and determines a resource reservation and/or resource scheduling of the first network device based on the first information; wherein the first information includes at least one of the following: a service cycle, a service type, a service arrival window, an average packet size, a service transmission reserved time window length, a time window cycle, a service arrival time point and/or allowable error, a successful transmission duration of service, and a service priority.

In a fifth aspect, the embodiments of the present disclosure provide a second network device, including: a second communication unit that sends first information to a first network device, and/or, sends the first information to a terminal device; wherein the first information includes at least one of the following: a service cycle, a service type, a service arrival window, an average packet size, a service transmission reserved time window length, a time window cycle, a service arrival time point and/or allowable error, a successful transmission duration of service, and a service priority.

In a sixth aspect, the embodiments of the present disclosure provide a terminal device, including: a third communication unit that receives first information from a second network device; and a third processing unit that determines a resource reservation and/or resource scheduling of the first network device based on the first information; wherein the first information includes at least one of the following: a service cycle, a service type, a service arrival window, an average packet size, a service transmission reserved time window length, a time window cycle, a service arrival time point and/or allowable error, a successful transmission duration of service, and a service priority.

In a seventh aspect, the embodiments of the present disclosure provide a network device, including: a processor and a memory configure to store a computer program that can run on the processor, wherein the memory is configured to store a computer program, and the processor is configured to call and run the computer program stored in the memory to execute the method in any one of the first to second aspects or any of the implementations thereof.

In an eighth aspect, the embodiments of the present disclosure provide a terminal device including: a processor and a memory configure to store a computer program that can run on the processor, wherein the memory is configured to store a computer program, and the processor is configured to call and run the computer program stored in the memory to execute the methods in the third aspect or any of the implementations thereof.

In a ninth aspect, the embodiments of the present disclosure provide a chip, a processor, configured to call and run a computer program from a memory, so that a device installed with the chip performs the method in any one of the first to third aspects or any of the implementations thereof.

In a tenth aspect, the embodiments of the present disclosure provide a computer-readable storage medium, configured to store a computer program that causes a computer to perform the method in any one of the first to third aspects or any of the implementations thereof.

In an eleventh aspect, the embodiments of the present disclosure provide a computer program product, including computer program instructions, which cause a computer to perform the method in any one of the first to third aspects or any of the implementations thereof.

In a twelfth aspect, the embodiments of the present disclosure provide a computer program, which causes a computer to perform the method in any one of the first to third aspects or any of the implementations thereof.

DETAILED DESCRIPTION

In order to understand characteristics and technical content of embodiments of the present disclosure in more detail, implementations of the embodiments of the present disclosure will be described in detail below with reference to the accompanying drawings. The attached drawings are for reference and description purposes only and are not intended to limit the embodiments of the present disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 1:
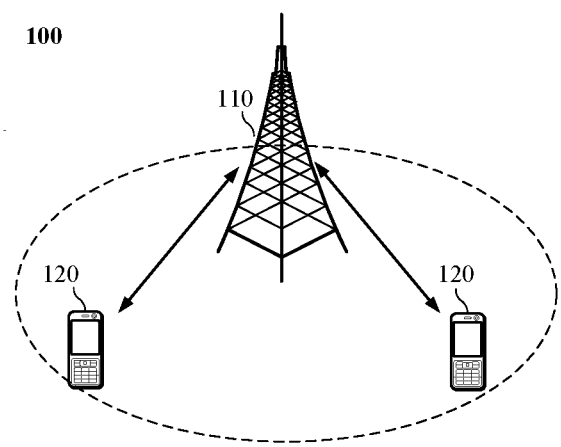
FIG. 1 is a first schematic diagram of a communication system architecture provided by an embodiment of the present disclosure.

Exemplarily, a communication system 100 applied in an embodiment of the present disclosure may be shown in FIG. 1. The communication system 100 may include a network device 110. The network device 110 may be a device communicating with user equipment (UE) 120 (or referred to as a communication terminal or a terminal). The network device 110 may provide communication coverage to a specific geographic region, and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, UE in a 5G network, or UE in the PLMN that will be evolved in the future, and the like.

Optionally, device to device (D2D) communication may be realized among the UE 120.

Optionally, a 5G system or 5G network may also be referred to as a new radio (NR) system or NR network.

FIG. 1 exemplarily illustrates one network device and two of UEs. Optionally, the communication system 100 may include a plurality of network devices, and a coverage range of each network device may include other numbers of UEs, which is not limited by the embodiment of the present disclosure.

Optionally, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 1 is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

In order to understand the characteristics and technical content of the embodiments of the present disclosure in more detail, implementations of the embodiments of the present disclosure will be described in detail below with reference to the accompanying drawings. The attached drawings are for reference and explanation purposes only, and are not intended to limit the embodiments of the present disclosure.

First Embodiment

Figure 2:
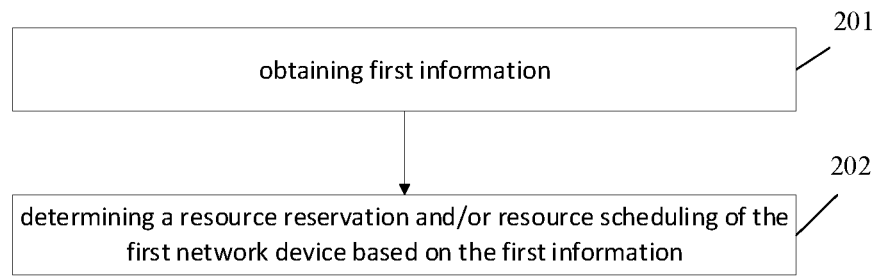
FIG. 2 is a first schematic flowchart of a resource scheduling method provided by an embodiment of the present disclosure.

An embodiment of the present disclosure provides a resource scheduling method, which is applied to a first network device. As shown in FIG. 2, the method includes: in step 201, first information is obtained; in step 202, a resource reservation and/or resource scheduling of the first network device is determined based on the first information; the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device.

The determining the resource reservation and/or resource scheduling of the first network device may be determining the resource reservation and/or resource scheduling of the first network device within a preset period of time according to at least one piece of information contained in the first information.

In addition, it may also include at least one of the following: determining a resource reservation and/or resource scheduling for a first service in the first network device based on the first information; determining a resource reservation and/or resource scheduling for a data bearer bearing the first service in the first network device based on the first information; determining a resource reservation and/or resource scheduling for a QoS flow bearing the first service in the first network device based on the first information; determining a resource reservation and/or resource scheduling for a PDU session bearing the first service in the first network device based on the first information; determining a resource reservation and/or resource scheduling for a logical channel bearing the first service in the first network device based on the first information; and determining a resource reservation and/or resource scheduling for a logical channel group bearing the first service in the first network device based on the first information.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

In the first information, the service arrival time point and/or allowable error can be a single time point of one service arrival, or a single time point of the service arrival within one service cycle, or multiple time points of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between the service arrival and the successful service transmissions, or a duration between the service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing. The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

The obtaining the first information in this embodiment may be: receiving the first information from a third-party application server or a terminal device or a second network device.

The second network device may be a core network device. In other words, the first information received by the base station side may be sent by the core network or by the terminal device. For example, the second network device includes at least one of the following devices: the core network device, such as UPF, SMF, AMF, and the third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

Optionally, the obtaining the first information further includes: determining the first information based on the second information; the second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

The first information is determined according to the second information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be: determining the service transmission reserved time window length and the time window cycle in the first information according to the service transmission reserved time window length, and the time window cycle. Alternatively, the determining method can be: determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length. For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the Qos parameter; the service transmission reserved time window length and the time window cycle in the first information can also be determined according to the allowable service identification (or recommended service identification) and the Qos parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

Before the determining the first information based on the second information, the method further includes: receiving the second information sent by the second network device, the third-party application server, or the terminal device.

It should be noted that the second information can be a part or all of the service transmission reserved time window length, the time window cycle, the service arrival time point and/or allowable error, the successful transmission duration of service, the load information, the available time-frequency resource, the service change indication, the service priority indication, the allowable service identification and/or QoS parameter, the recommended service identification and/or QoS parameter, the service cycle, the data packet size, and the continuous arrival time of data packet. For example, the second information comes from the terminal device or the third-party application server, and the second information is the following information: the service cycle, the service arrival time point and/or allowable error, and the successful transmission duration of service. The second network device determines the first information according to the second information.

The first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Second Embodiment

Figure 3A:
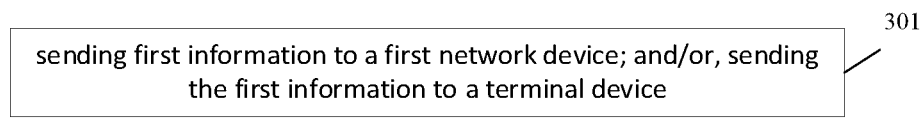
FIG. 3A is a second schematic flowchart of a resource scheduling method provided by an embodiment of the present disclosure.

An embodiment of the present disclosure provides a resource scheduling method, applied to a second network device. As shown in FIG. 3A, the method includes: in step 301, first information is sent to a first network device; and/or, send the first information to a terminal device; the first information is used for determining a resource reservation and/or resource scheduling of the first network device, and the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device. The second network device may be a core network device. In other words, the first information received by the base station side may be sent by the core network or by the terminal device. In other words, the first information received by the UE side may be sent by the core network or by the first network device. For example, the second network device includes at least one of the following devices: the core network device, such as UPF, SMF, and AMF; in addition, the second network device may not be the core network device, for example, it may be a third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

The determining the resource reservation and/or resource scheduling of the first network device may be determining the resource reservation and/or resource scheduling of the first network device within a preset period of time according to at least one piece of information contained in the first information, for example, the resource reservation and/or resource scheduling is within a preset period of time after receiving the information.

Alternatively, the first information is used for determining at least one of the following: a resource reservation and/or resource scheduling for a first service in the first network device; a resource reservation and/or resource scheduling for a data bearer bearing the first service in the first network device; a resource reservation and/or resource scheduling for a QoS flow bearing the first service in the first network device; a resource reservation and/or resource scheduling for a PDU session bearing the first service in the first network device; a resource reservation and/or resource scheduling for a logical channel bearing the first service in the first network device; and a resource reservation and/or resource scheduling for a logical channel group bearing the first service in the first network device.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

In the first information, the service arrival time point and/or allowable error can be a single time point of one service arrival, or a single time point of the service arrival within one service cycle, or multiple time points of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between a configured service arrival and the successful service transmission, or a duration between a configured service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing. The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

In this embodiment, the second network device triggers a method for sending the first information, and the sending the first information to the first network device and/or the terminal device includes: sending the first information to the first network device and/or the terminal device when a preset condition is met.

The preset conditions include: a transmission cycle is met; and/or, a trigger condition is met, wherein, the trigger condition includes one of the following: upon receiving second information, upon receiving third information, upon reporting capability information, upon a start or end of a service, upon a service model change, and upon a service priority change.

For example, the second network device reports/transmits the first information when the transmission cycle is met. The transmission cycle can be set according to actual conditions, and details are not described in detail.

The first information is reported/transmitted when the trigger condition is met, such as upon receiving the second information, upon receiving the third information, upon reporting the capability information, upon the start or end of the service, upon the service model change, and upon the service priority change.

The third information is dedicatedly used for indicating to report/transmit the first information. The third information is beard by a dedicated message. For example, one of a RRC message, a MAC CE, a DCI is use to bear the third information, which is not limited in this embodiment. After receiving the information, the terminal device determines to report the first information. Or, when receiving the third information from the base station, the core network determines to transmit the first information.

For another example, after the second information is received, it is determined that the trigger condition is met, and the first information is reported. Or, after the second information is received, when the reporting condition is met, the first information may be reported. The reporting conditions include, but are not limited to: reaching a reporting cycle, the start or end of the service, the service model change, and the service priority change.

Figure 3B:
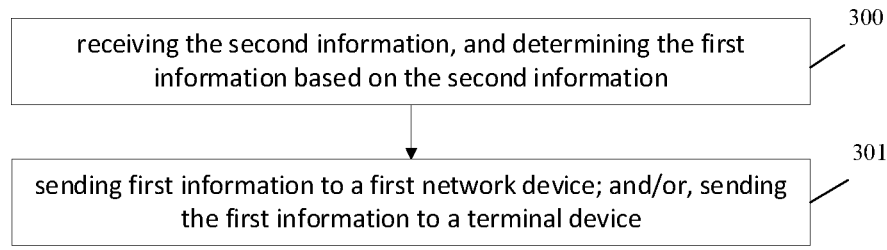
FIG. 3B is a third schematic flowchart of a resource scheduling method provided by an embodiment of the present disclosure.

On the basis of FIG. 3A, referring to FIG. 3B, the method further includes: in step 300, second information is received, and the first information is determined based on the second information.

The second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

The first information is determined according to the second information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be: determining the service transmission reserved time window length and the time window cycle in the first information according to the service transmission reserved time window length, and the time window cycle. Alternatively, the determining method can be: determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length. For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the Qos parameter; the service transmission reserved time window length and the time window cycle in the first information can also be determined according to the allowable service identification (or recommended service identification) and the Qos parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

Before the determining the first information based on the second information, the method further includes: receiving the second information sent by the third network device, the third-party application server, or the terminal device.

The third network device includes at least one of the following devices: the base station device and the third-party application server. Alternatively, the third network device is same as the first network device, or the third network device may also be different from the first network device. That is, the third network device may be the first network device itself, that is, the first network device sends the second information obtained in advance by itself to the second network device, and the second network device determines the first information.

The above is a processing method in which the second network device determines the first information based on the received second information, and then sends the first information to the first network device; this embodiment can also provide another processing method, that is, the determining the first information is not performed. Instead, the second information is sent directly to the first network device, specifically: the second information is sent to the first network device.

A timing for sending the second information to the first network device can be determined according to the trigger condition, that is, the second information is reported/transmitted when a certain condition is met.

For example, when the transmission cycle is met, the reporting/transmission is performed. The transmission cycle in this embodiment may be different from or the same as the transmission cycle in the first embodiment, and can be set according to actual conditions.

And/or, when the trigger condition is met, the reporting/transmission is performed. For example, when the fourth information is received, when the capability information is reported, when the service starts or ends, when the service model changes, when the service priority changes, and when the PDU session is modified, the reporting/transmission is performed.

The fourth information is dedicatedly used to indicate to report/transmit the second information. The fourth information is beard by the dedicated information or transmitted through a dedicated process. For example, the fourth information is transmitted during PDU session modification, or the session establishment process.

For example, when the trigger condition is met, the transmission is performed. Or, after receiving the fourth information, the second network device reports the first information when the second condition is met. The second condition includes, but is not limited to: reaching a reporting cycle, the start or end of the service, the service model change, and the service priority change.

In combination with the above solutions, in this embodiment, the first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Third Embodiment

Figure 4:
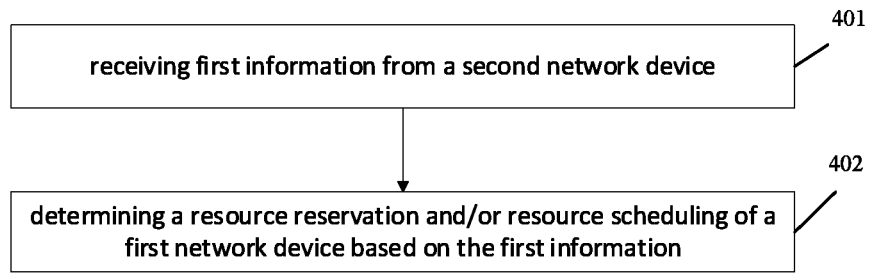
FIG. 4 is a fourth schematic flowchart of a resource scheduling method provided by an embodiment of the present disclosure.

An embodiment of the present disclosure provides a resource scheduling method, applied to a terminal device. As shown in FIG. 4, the method includes: in step 401, first information is received from a second network device; and in step 402, a resource reservation and/or resource scheduling of the first network device is determined based on the first information; the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device. The second network device may be a core network device. In other words, the first information received by the base station side may be sent by the core network or by the terminal device. In other words, the first information received by the UE side may be sent by the core network or by the base station device. For example, the second network device includes at least one of the following devices: the core network device, such as UPF, SMF, AMF or a third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

The determining the resource reservation and/or resource scheduling of the first network device may be determining the resource reservation and/or resource scheduling of the first network device within a preset period of time according to at least one piece of information contained in the first information, for example, the resource reservation and/or resource scheduling is within a preset period of time after receiving the information.

Alternatively, the determining the resource reservation and/or resource scheduling of the first network device includes at least one of the following: determining a resource reservation and/or resource scheduling for a first service in the first network device based on the first information; determining a resource reservation and/or resource scheduling for a data bearer bearing the first service in the first network device based on the first information; determining a resource reservation and/or resource scheduling for a QoS flow bearing the first service in the first network device based on the first information; determining a resource reservation and/or resource scheduling for a PDU session bearing the first service in the first network device based on the first information; determining a resource reservation and/or resource scheduling for a logical channel bearing the first service in the first network device based on the first information; and determining a resource reservation and/or resource scheduling for a logical channel group bearing the first service in the first network device based on the first information.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

It should be noted here that specific content contained in the first information in this embodiment may be different from the first and second embodiments, that is, the first information in this embodiment may include content in a first part, and the first and second embodiments can include content in a second part and a third part respectively. The content in the first part, the content in the second part and the content in the third part may be partially the same or completely different, which will not exclusively listed herein.

In the first information, the service arrival time point and/or allowable error can be a single time point of one service arrival, or a single time point of the service arrival within one service cycle, or multiple time points of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between the service arrival and the successful service transmission, or a duration between the service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing. The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

On this basis, the method further includes: sending second information to the second network device; and/or, sending the second information to the first network device; the second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

That is, the terminal device may send the second information to both the base station and/or the core network. After the base station or the core network receives the second information, regarding the subsequent processing, please refer to the first and second embodiments, which will not be repeated here. Optionally, the content contained in the second information sent to the base station or the core network may be the same or different.

The second information is used for determining the first information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be: determining the service transmission reserved time window length and the time window cycle in the first information according to the service transmission reserved time window length, and the time window cycle. Alternatively, the determining method can be: determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length. For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the QoS parameter; the service transmission reserved time window length and the time window cycle in the first information can also be determined according to the allowable service identification (or recommended service identification) and the Qos parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

A timing for sending the second information to the first network device can be determined according to the trigger condition, that is, the second information is reported/transmitted when a certain condition is met.

For example, when the transmission cycle is met, the reporting/transmission is performed. The transmission cycle in this embodiment may be different from or the same as the transmission cycle in the first embodiment, and can be set according to actual conditions.

And/or, when the trigger condition is met, the reporting/transmission is performed. For example, when the third information is received, when the capability information is reported, when the service starts or ends, when the service model changes, when the service priority changes, and when the PDU session is modified, the reporting/transmission is performed.

The third information is dedicatedly used to indicate to report/transmit the second information. The third information is beard by the dedicated information or transmitted through a dedicated process. For example, the terminal device uses, including but not limited to one of the RRC message, the MAC CE, and the DCI to transmit the second information.

For example, when the trigger condition is met, the transmission is performed. Or, after receiving the third information, the UE device reports the first information when the second condition is met. The second condition includes, but is not limited to: reaching a reporting cycle, the start or end of the service, the service model change, and the service priority change.

The foregoing solution provides a process in which the terminal device receives and processes the first information; on this basis, the terminal device may further include: sending the first information to the first network device. For the content contained in the first information and the subsequent processing based on the first information by the first network device, please refer to the description of the first embodiment, which will not be repeated here. Optionally, the content contained in the first information is the same as or different from the content of the first information sent by the core network, and is the same or different from the content of the first information sent by the base station.

In combination with the above solutions, in this embodiment, the first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

Figure 5:
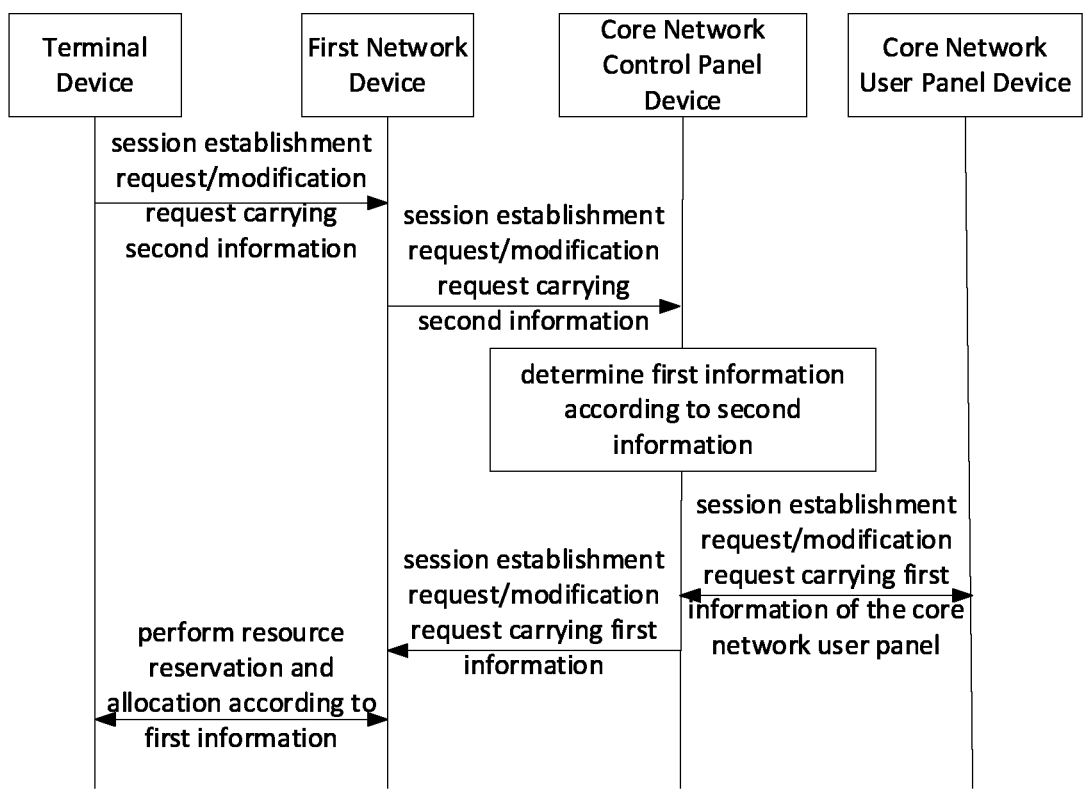
FIG. 5 is a fifth schematic flowchart of a resource scheduling method provided by an embodiment of the present disclosure.

Finally, in conjunction with FIG. 5, a comprehensive processing flow of the foregoing first, second and third embodiments is described. It should be understood that only one implementation situation is described and is not exhaustive. The figure includes the terminal device; the first network device, namely the access network device, which may be RAN; the second network device, which may be the core network control plane device and the core network user plane device, respectively, with integrated functions of the two devices.

The terminal device initiates a session establishment request to the first network device. The message can carry the second information on the terminal device side. The first network device can also carry the second information on the first network device side when sending the session establishment request to the core network device. The second information on the terminal device side may be related to uplink resource reservation and allocation, and uplink service information, and the second information on the first network device side may be related to uplink and/or downlink resource reservation and allocation. The second information includes but not limited to at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

The available time-frequency resource is a resource other than SPS/configured grant, or the available time-frequency resource is a resource reserved for use by the first service. The uplink service information includes but is not limited to at least one of the following: a packet size and a packet arrival interval; the first service includes but is not limited to one of the following services: a TSN service, a URLLC service, and an Internet of Vehicles service.

The core network control plane device may determine the first information according to the second information, and the first information includes at least one of the following: a service cycle, a service type, a service arrival window, an average packet size, a service transmission reserved time window length, a time window cycle, a service arrival time point and/or allowable error, a successful transmission duration of service, a service priority, an allowable service identification and/or QoS parameter, a recommended service identification and/or QoS parameter, a data packet size, and continuous arrival time of data packet. The service arrival time point and/or allowable error can be a single time point of one service arrival, or multiple time points of the service arrival within one service cycle, or multiple time points of the service arrival (non-periodic). The service arrival allowable error is an allowable error range for the service arrival time point, that is, an allowable error window or a delayed arrival window. The successful transmission duration of service is a duration between a configured service arrival and the successful service transmission, or a duration between a configured service arrival and a certain service transmission. The service transmission reserved time window length is a service arrival time window. The time window cycle is a cycle of the service transmission reserved time window. The first information includes uplink transmission and/or downlink transmission. For example. The first information may be an UL/DL indication alone, or may not distinguish between uplink and downlink indications.

The core network control plane device sends the first information to the core network user plane device for the resource reservation and allocation.

The core network sends the first information to the base station, and the base station determines the resource reservation and/or resource scheduling for the device based on the first information.

The content of the first information sent by the core network to the core network user plane device and the content of the first information sent by the core network to the base station may be different. The first information sent by the core network to the core network user plane device can be used by the UPF device to determine the resource reservation and/or resource scheduling corresponding to the first service, or the UPF determines the resource reservation and/or resource scheduling of the base station device corresponding to the first service. The first information sent by the core network to the base station device is used by the base station device to determine the resource reservation and/or resource scheduling corresponding to the first service. The first service includes but is not limited to one of the following services: a TSN service, a URLLC service, and an Internet of Vehicles service.

The first network device is a base station device. The first information comes from the core network device, such as SMF.

The terminal device and the base station may report the updated first information to the core network device during the establishment and/or modification of the PDU session. For example, when the third information is received, when the capability information is reported, when the service starts or ends, when the business model changes, and when the business priority changes, the terminal device and the base station may report the updated first information to the core network device.

The first information corresponds to a transmission in an uplink direction, and/or corresponds to a transmission in a downlink direction.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range. According to the first information, the base station completes the reservation and allocation of uplink and/or downlink resources through a dedicated message bearer. Among them, the dedicated message may be an RRC message.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Fourth Embodiment

Figure 6:
FIG. 6 is a first structural schematic diagram of components of a network device provided by an embodiment of the present disclosure.

An embodiment of the present disclosure provides a first network device. As shown in FIG. 6, the first network device includes: a first processing unit 61 that obtains first information, and determines a resource reservation and/or resource scheduling of the first network device based on the first information; the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device.

The determining the resource reservation and/or resource scheduling of the first network device may be determining the resource reservation and/or resource scheduling of the first network device within a preset period of time according to at least one piece of information contained in the first information.

Alternatively, it may also be the first processing unit 61 executes at least one of the following: determining a resource reservation and/or resource scheduling for a first service in the first network device based on the first information; determining a resource reservation and/or resource scheduling for a data bearer bearing the first service in the first network device based on the first information; determining a resource reservation and/or resource scheduling for a QoS flow bearing the first service in the first network device based on the first information; determining a resource reservation and/or resource scheduling for a PDU session bearing the first service in the first network device based on the first information; determining a resource reservation and/or resource scheduling for a logical channel bearing the first service in the first network device based on the first information; and determining a resource reservation and/or resource scheduling for a logical channel group bearing the first service in the first network device based on the first information.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

In the first information, the service arrival time point and/or allowable error can be a single time point of one service arrival, or multiple time points of the service arrival within one service cycle, or a single time point of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between the service arrival and the successful service transmission, or a duration between the service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing. The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

The first network device in this embodiment further includes: a first communication unit 62 that receives the first information from a third-party application server or a terminal device or a second network device.

The second network device may be a core network device. In other words, the first information received by the base station side may be sent by the core network or by the terminal device. For example, the second network device includes at least one of the following devices: the core network device, such as UPF, SMF, AMF, and the third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

The first processing unit 61 determines the first information based on the second information; the second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

The first information is determined according to the second information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be: determining the service transmission reserved time window length and the time window cycle in the first information according to the service transmission reserved time window length, and the time window cycle. Alternatively, the determining method can be: determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length. For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the Qos parameter; the service transmission reserved time window length and the time window cycle in the first information can also be determined according to the allowable service identification (or recommended service identification) and the Qos parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

The first communication unit 62 receives the second information sent by the second network device, the third-party application server, or the terminal device.

It should be noted that the second information can be a part or all of the service transmission reserved time window length, the time window cycle, the service arrival time point and/or allowable error, the successful transmission duration of service, the load information, the available time-frequency resource, the service change indication, the service priority indication, the allowable service identification and/or QoS parameter, the recommended service identification and/or QoS parameter, the service cycle, the data packet size, and the continuous arrival time of data packet. For example, the second information comes from the terminal device or the third-party application server, such as the second network device, and the second information is the following information: the service cycle, the service arrival time point and/or allowable error, and the successful transmission duration of service. The second network device determines the first information according to the second information.

The first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Fifth Embodiment

Figure 7:
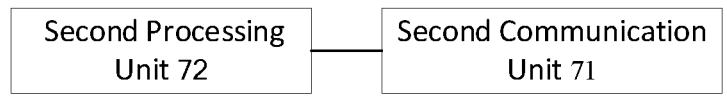
FIG. 7 is a second structural schematic diagram of components of a network device provided by an embodiment of the present disclosure.

An embodiment of the present disclosure provides a second network device. As shown in FIG. 7, the second network device includes: a second communication unit 71 that sends first information to a first network device; and/or, sends the first information to a terminal device; the first information is used for determining a resource reservation and/or resource scheduling of the first network device, and the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device. The second network device may be a core network device. In other words, the first information received by the base station side may be sent by the core network or by the terminal device. In other words, the first information received by the UE side may be sent by the core network or by the first network device. For example, the second network device includes at least one of the following devices: the core network device, such as UPF, SMF, and AMF; in addition, the second network device may not be the core network device, for example, it may be a third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

The determining the resource reservation and/or resource scheduling of the first network device may be determining the resource reservation and/or resource scheduling of the first network device within a preset period of time according to at least one piece of information contained in the first information, for example, the resource reservation and/or resource scheduling is within a preset period of time after receiving the information.

Alternatively, the first information is used for determining at least one of the following: a resource reservation and/or resource scheduling for a first service in the first network device; a resource reservation and/or resource scheduling for a data bearer bearing the first service in the first network device; a resource reservation and/or resource scheduling for a QoS flow bearing the first service in the first network device; a resource reservation and/or resource scheduling for a PDU session bearing the first service in the first network device; a resource reservation and/or resource scheduling for a logical channel bearing the first service in the first network device; and a resource reservation and/or resource scheduling for a logical channel group bearing the first service in the first network device.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

In the first information, the service arrival time point and/or allowable error can be a single time point of one service arrival, or multiple time points of the service arrival within one service cycle, or a single time point of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between a configured service arrival and the successful service transmission, or a duration between a configured service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing.

The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

In the second network device of this embodiment, the second communication unit 71 sends the first information to the first network device and/or the terminal device when a preset condition is met.

The preset conditions include: a transmission cycle is met; and/or, a trigger condition is met, wherein, the trigger condition includes one of the following: upon receiving second information, upon receiving third information, upon reporting capability information, upon a start or end of a service, upon a service model change, and upon a service priority change.

For example, the second network device reports/transmits the first information when the transmission cycle is met. The transmission cycle can be set according to actual conditions, and details are not described in detail.

The first information is reported/transmitted when the trigger condition is met, such as upon receiving the third information, upon reporting the capability information, upon the start or end of the service, upon the service model change, and upon the service priority change.

The third information is dedicatedly used for indicating to report/transmit the first information. The third information is beard by a dedicated message. For example, one of a RRC message, a MAC CE, a DCI is use to bear the third information, which is not limited in this embodiment. After receiving the information, the terminal device determines to report the first information. Or, when receiving the third information from the base station, the core network determines to transmit the first information.

For another example, after the second information is received, it is determined that the trigger condition is met, and the first information is reported. Or, after the second information is received, when the reporting condition is met, the first information may be reported. The reporting conditions include, but are not limited to: reaching a reporting cycle, the start or end of the service, the service model change, and the service priority change.

On this basis, the second network device further includes: a second processing unit 72 that determines the first information based on the second information.

The second communication unit 71 receives second information.

The second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

The first information is determined according to the second information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be: determining the service transmission reserved time window length and the time window cycle in the first information according to the service transmission reserved time window length, and the time window cycle. Alternatively, the determining method can be: determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length.

For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the QoS parameter; the service transmission reserved time window length and the time window cycle in the first information can also be determined according to the allowable service identification (or recommended service identification) and the QoS parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

Before the determining the first information based on the second information, the second communication unit 71 receives the second information sent by the third network device, the third-party application server, or the terminal device.

It should be pointed out that the second information may be part or all of the above at least one piece of information. For example, the second information comes from the terminal device or the third-party application server (the third network device). The second information is the following information: the service cycle, the service arrival time point and/or allowable error, and the successful transmission duration of service. The second network device determines the first information according to the second information.

The third network device includes at least one of the following devices: the base station device and the third-party application server. Alternatively, the third network device is same as the first network device, or the third network device may also be different from the first network device. That is, the third network device may be the first network device itself, that is, the first network device sends the second information obtained in advance by itself to the second network device, and the second network device determines the first information.

The above is a processing method in which the second network device determines the first information based on the received second information, and then sends the first information to the first network device; this embodiment can also provide another processing method, that is, the determining the first information is not performed. Instead, the second information is sent directly to the first network device, specifically: the second information is sent to the first network device.

A timing for sending the second information to the first network device can be determined according to the trigger condition, that is, the second information is reported/transmitted when a certain condition is met.

For example, when the transmission cycle is met, the reporting/transmission is performed. The transmission cycle in this embodiment may be different from or the same as the transmission cycle in the first embodiment, and can be set according to actual conditions.

And/or, when the trigger condition is met, the reporting/transmission is performed. For example, when the fourth information is received, when the capability information is reported, when the service starts or ends, when the service model changes, when the service priority changes, and when the PDU session is modified, the reporting/transmission is performed.

The fourth information is dedicatedly used to indicate to report/transmit the second information. The fourth information is beard by the dedicated information or transmitted through a dedicated process. For example, the fourth information is transmitted during PDU session modification, or the session establishment process.

For example, when the trigger condition is met, the transmission is performed. Or, after receiving the fourth information, the second network device reports the first information when the second condition is met. The second condition includes, but is not limited to: reaching a reporting cycle, the start or end of the service, the service model change, and the service priority change.

In combination with the above solutions, in this embodiment, the first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Sixth Embodiment

Figure 8:
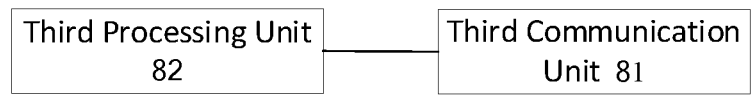
FIG. 8 is a structural schematic diagram of components of a terminal device provided by an embodiment of the present disclosure.

An embodiment of the present disclosure provides a terminal device. As shown in FIG. 8, the terminal device includes: a third communication unit 81 that receives first information from a second network device; and a third processing unit 82 that determines a resource reservation and/or resource scheduling of the first network device based on the first information; the first information includes at least one of the following: the first information includes at least one of the following: a service cycle, a service type, a service arrival window, an average packet size, a service transmission reserved time window length, a time window cycle, a service arrival time point and/or allowable error, a successful transmission duration of service, a service priority an allowable service identification and/or QoS parameter, a recommended service identification and/or QoS parameter, a service cycle, a data packet size, and continuous arrival time of data packet.

The first network device in this embodiment may be a base station device. The second network device may be a core network device. In other words, the first information received by the UE side may be sent by the core network or by the base station device. For example, the second network device includes at least one of the following devices: the core network device, such as UPF, SMF, AMF or a third-party application server. In addition, in this embodiment, the terminal device includes at least one of the following devices: user equipment supporting the first service, designated user equipment, and all user equipment under a cell. For example, when the first information comes from the terminal device, the first network device may use the first information to determine the resource reservation and/or resource scheduling.

The determining the resource reservation and/or resource scheduling of the first network device may be determining the resource reservation and/or resource scheduling of the first network device within a preset period of time according to at least one piece of information contained in the first information, for example, the resource reservation and/or resource scheduling is within a preset period of time after receiving the information.

Alternatively, the third processing unit 82 executes at least one of the following: determining a resource reservation and/or resource scheduling for a first service in the first network device based on the first information; determining a resource reservation and/or resource scheduling for a data bearer bearing the first service in the first network device based on the first information; determining a resource reservation and/or resource scheduling for a QoS flow bearing the first service in the first network device based on the first information; determining a resource reservation and/or resource scheduling for a PDU session bearing the first service in the first network device based on the first information; determining a resource reservation and/or resource scheduling for a logical channel bearing the first service in the first network device based on the first information; and determining a resource reservation and/or resource scheduling for a logical channel group bearing the first service in the first network device based on the first information.

It can be understood that, based on the first information, the resource reservation and/or resource scheduling corresponding to the first service in the first network device can be obtained.

Alternatively, the resource reservation and/or resource scheduling of other related resources such as the data bearer bearing the first service in the first network device may also be determined based on the first information.

It should be noted here that specific content contained in the first information in this embodiment may be different from the first and second embodiments, that is, the first information in this embodiment may include content in a first part, and the first and second embodiments can include content in a second part and a third part respectively. The content in the first part, the content in the second part and the content in the third part may be partially the same or completely different, which will not exclusively listed herein.

In the first information, the service arrival time point and/or allowable error can be a single time point of one service arrival, or multiple time points of the service arrival within one service cycle, or a single time point of the service arrival within one service cycle, or multiple time points of the service arrival (non-periodic).

In the first information, the service arrival allowable error is an allowable error range for the service arrival time point, that is, an allowable error window or a delayed arrival window.

In the first information, the successful transmission duration of service is a duration between the service arrival and the successful service transmission, or a duration between the service arrival and a certain service transmission, or a duration between a configured service arrival and the successful service transmission, or a duration between a configured service arrival and a certain service transmission.

In the first information, the service transmission reserved time window length is a service arrival time window.

In the first information, the time window cycle is a cycle of the service transmission reserved time window.

For example, the first network device, that is, the base station, configures the resource (such as configured grant/SPS) or dynamically schedules the resource transmission according to the service arrival time point and/or allowable error, the service arrival time determined by the successful transmission duration of service, and how long a data transmission need to be completed within a tolerance range.

For another example, the first service and a type of the first service can be determined at least according to the information, such as the service type, in the first information, and then the resource reservation and/or resource scheduling for the first service can be determined according to the information, such as the service arrival window, and the average packet size. It should be understood that the resource reservation and/or resource scheduling can be based on at least one piece of information in the first information, and the foregoing is only an example and does not mean that only the above information can be used for the resource reservation and resource scheduling processing. The resource reservation and/or resource scheduling can be understood as a resource that is required to be reserved for the first service to be performed or a task with a preset duration by the first network device, and can also include a time domain position and a frequency domain position of the resource, and the resource scheduling can be a resource strategy to be scheduled in order to perform a certain service or a task with a certain preset duration.

For another example, at least one of the QoS flow, PDU session, logical channel, logical channel group corresponding to bearing the first service, and the type of the first service are determined at least according to the information in the first information, such as the service arrival time point and/or allowable error, the successful transmission duration of service, a recommended service identification and/or QoS parameter, a data packet size, and continuous arrival time of data packet. Then the resource reservation and/or resource scheduling for at least one of the QoS flow, PDU session, logical channel, and logical channel group corresponding to the first service according to the information such as the service arrival window, the average packet size.

On this basis, the third communication unit 81 sends second information to the second network device; and/or, sends the second information to the first network device; the second information includes at least one of the following: a service transmission reserved time window length, a time window cycle, a service arrival time point and/or allowable error, a successful transmission duration of service, load information, an available time-frequency resource, a service change indication, a service priority indication, an allowable service identification and/or QoS parameter, a recommended service identification and/or QoS parameter, a service cycle, a data packet size, and continuous arrival time of data packet.

That is, the terminal device may send the second information to both the base station and/or the core network. After the base station or the core network receives the second information, regarding the subsequent processing, please refer to the first and second embodiments, which will not be repeated here. Optionally, the content contained in the second information sent to the base station or the core network may be the same or different.

The second information is used for determining the first information. For example, the first information is determined according to the second information or derivative information thereof. Alternatively, the first information is determined according to the second information and/or other information.

The available time-frequency resource is a resource other than SPS/configured grant, or the available time-frequency resource is a resource reserved for use by the first service.

For example, the second information is the following information: the service identification, the service priority information, the load information, and the available time-frequency resource. The second network device determines a service model mapping from TSN to 5GC according to the second information, and determines the service transmission reserved time window length, and the time window cycle, that is, the first information.

Alternatively, the second information is the following information: the service cycle, the service arrival time point and/or allowable error, and the successful transmission duration of service. The second network device determines a service model mapping from TSN to 5GC according to the second information, and determines the service transmission reserved time window length, and the time window cycle, that is, the first information.

Alternatively, the second information is the following information: the recommended service identification and/or QoS parameter, and the second network device determines the first information according to the second information.

For example, the first information can be determined by the second information, and the determining method can be: determining the service transmission reserved time window length, the time window cycle and the service arrival time point and/or allowable error in the first information according to the service transmission reserved time window length, the time window cycle and the service arrival time point and/or allowable error. Alternatively, the determining method can be determining the service transmission reserved time window length and the time window cycle in the first information according to the service transmission reserved time window length, and the time window cycle. Alternatively, the determining method can be determining the service arrival time point and/or allowable error and the successful transmission duration of service in the first information according to the service arrival time point and/or allowable error and the successful transmission duration of service. Further, there is also an indirect method to determine the first information. For example, when the load information is transmitted in the second information, the successful transmission duration of service and the service transmission reserved time window length in the first information can be determined according to the amount of data contained in the load information and/or the continuous arrival time of the data packet; when the second information contains the available time-frequency resource, the service arrival time point and/or the service transmission reserved time window length in the first information can be determined according to the available time-frequency resource. For example, if a time domain resource in the available time-frequency resource is t1-t2, the service transmission reserved time window length can be less than this length. For another example, when the second information contains the data packet size and the continuous arrival time of the data packet, the average packet size, the service transmission reserved time window length or the successful transmission duration of service corresponding to a transmission data packet can be determined, which can be estimated according to parameters such as processing efficiency, and the specific estimation method will not be repeated. Alternatively, the service priority can also be determined according to the allowable service identification (or recommended service identification) and the QoS parameter; the service transmission reserved time window length and the time window cycle in the first information can also be determined according to the allowable service identification (or recommended service identification) and the QoS parameter; alternatively, the service priority in the first information may be determined directly according to the service priority indication in the second information. It should be understood that the foregoing are only a few examples of determining the first information based on the second information. In fact, there may be more ways to combine the content of the second information to obtain the first information, but this embodiment will not exhaustively list different examples.

A timing for sending the second information to the first network device can be determined according to the trigger condition, that is, the second information is reported/transmitted when a certain condition is met.

For example, when the transmission cycle is met, the reporting/transmission is performed. The transmission cycle in this embodiment may be different from or the same as the transmission cycle in the first embodiment, and can be set according to actual conditions.

And/or, when the trigger condition is met, the reporting/transmission is performed. For example, when the third information is received, when the capability information is reported, when the service starts or ends, when the service model changes, when the service priority changes, and when the PDU session is modified, the reporting/transmission is performed.

The third information is dedicatedly used to indicate to report/transmit the second information. The third information is beard by the dedicated information or transmitted through a dedicated process. For example, the terminal device uses, including but not limited to one of the RRC message, the MAC CE, and the DCI to transmit the second information.

For example, when the trigger condition is met, the transmission is performed. After the third information is received, the first information is reported when the second condition is met. The second condition includes, but is not limited to: reaching a reporting cycle, the start or end of the service, the service model change, and the service priority change.

The foregoing solution provides a process in which the terminal device receives and processes the first information; on this basis, the terminal device may further include: sending the first information to the first network device. For the content contained in the first information and the subsequent processing based on the first information by the first network device, please refer to the description of the first embodiment, which will not be repeated here. Optionally, the content contained in the first information is the same as or different from the content of the first information sent by the core network, and is the same or different from the content of the first information sent by the base station.

In combination with the above solutions, in this embodiment, the first information includes uplink transmission and/or downlink transmission; and/or, the second information includes the uplink transmission and/or the downlink transmission.

For example, the first information corresponds to a transmission in an uplink direction, and/or corresponds to a transmission in a downlink direction. Alternatively, the first information may be an uplink UL/downlink (DL) indication alone, or may not distinguish between uplink and downlink indications. The transmission of the second information is similar to that of the first information, and will not be repeated here.

The first information is beard by a dedicated message; and/or, the second information is beard by the dedicated message.

The first information and/or the second information are transmitted in at least one of the following processes: a registration process, a session establishment process, a session modification process, a service request process. For example, the first information is included in the following messages or procedures: RRC, MAC CE, DCI, and PDU Session Modification procedure.

The first service is a high-reliable and low-latency service. For example, the first service is one of the following: a TSN service, a URLLC service. Of course, the foregoing is only an example. In fact, various high-reliable and low-latency services can use the solution provided in this embodiment. For example, in addition to the foregoing examples, an Internet of Vehicles service may also be included.

Figure 9:
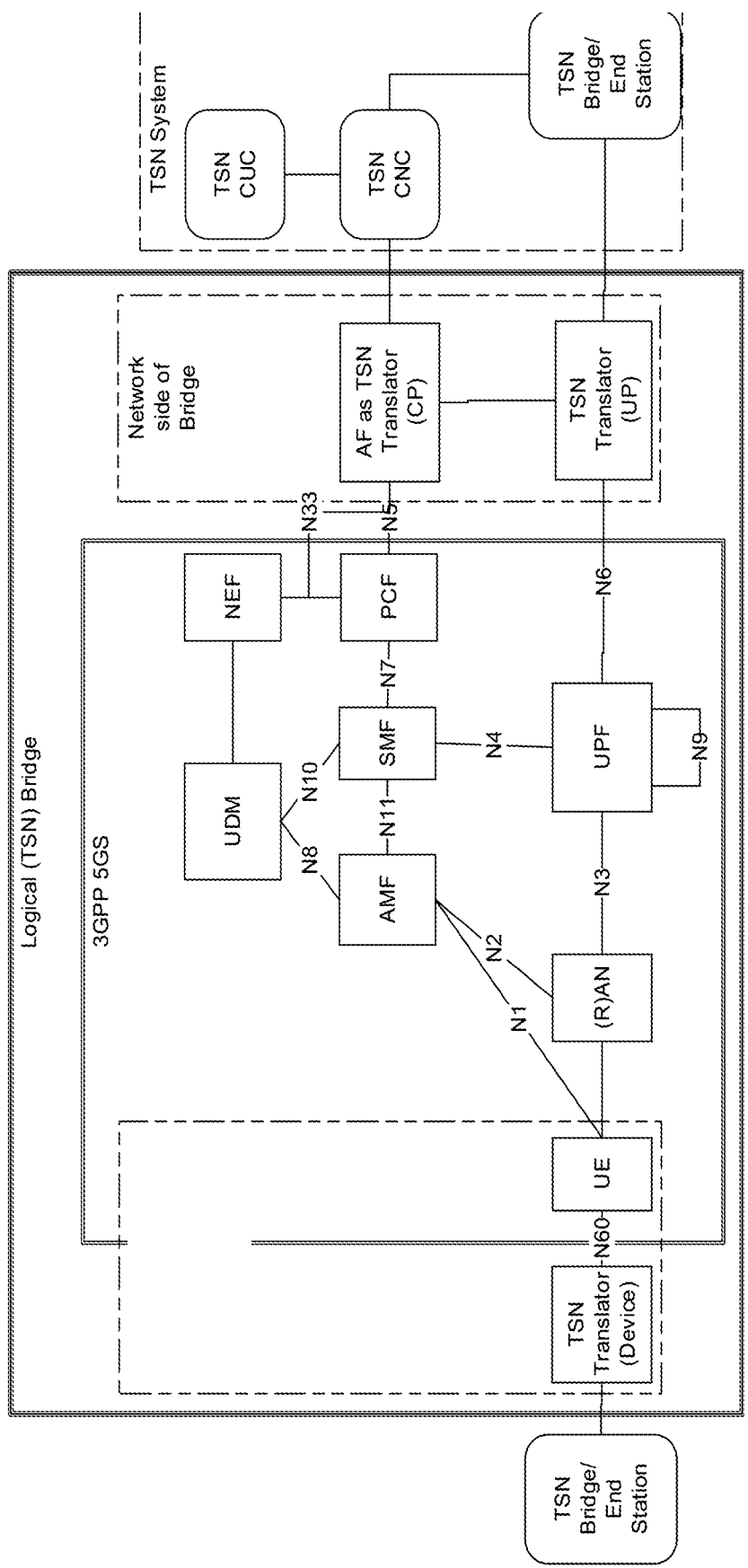
FIG. 9 is a schematic diagram of a system architecture provided by an embodiment of the present disclosure.

Under enhanced sub-topics related to the TSN network, in the TSN network, the 5C network will serve as a TSN bridge (see FIG. 9) to provide services for the TSN network and services. With respect to this, the NR system needs to support data packets with Ethernet frame structures can be transmitted by using the 5G network, while also ensuring the QoS requirements required in TR 22.804 to provide higher reliability and lower latency guarantees. In addition, it is also necessary to consider high clock synchronization accuracy required in TR 22.804, such as 1 us. Under an intra-UE prioritization/multiplexing sub-topic, it is necessary to consider an issue of priority transmission between data and control information of the same UE, and an issue of priority transmission between different data of the same UE.

The relevant definitions and typical scenarios of specific service characteristics and QoS requirements are as follows (see Table 1):

TABLE 1

| Case | #UE | Comm. service | TX period | Allowed E2E latency | Survival time | Data Packet size | Service area | TX periodicity | Use scenario |
|---|---|---|---|---|---|---|---|---|---|
| I | 20 | 99.9999% to 99.999999% | 0.5 ms | ≤TX period | Transmit period | 50 bytes | 15 m × 15 m × 3 m | Periodic | Motion control and control-to-control |
| II | 50 | 99.9999% to 99.999999% | 1 ms | ≤TX period | Transmit period | 40 bytes | 10 m × 5 m × 3 m | Periodic | Motion control and control-to-control |
| III | 100 | 99.9999% to 99.999999% | 2 ms | ≤TX period | Transmit period | 20 bytes | 100 m × 100 m × 30 m | Periodic | Motion control and control-to-control |

As can be seen from the above table, the existing Industrial Internet of Things (IIoT) service is a deterministic service, and the research on the R16 high-reliable and low-latency project is given priority for the deterministic periodic service transmission. In order to better guarantee the transmission of TSN services, a reasonable mapping method from TSN service QoS to 5GS QoS/pattern needs to be considered. The foregoing embodiments of the present disclosure provide a resource mapping method for the deterministic service in the network device.

It can be seen that by adopting the above solutions, the resource reservation and/or resource scheduling in the network device can be determined according to at least one piece of information in the first information, so that it can be determined that the network device can determine the resource reservation and/or allocation for corresponding service requirements, so as to effectively use the system resources and improve the system performance.

Figure 10:
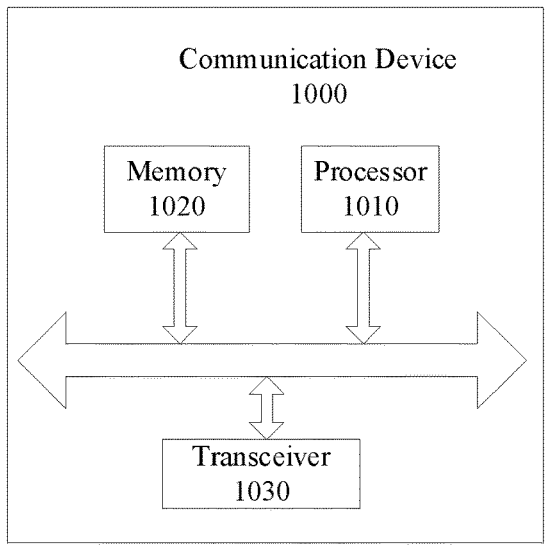
FIG. 10 is a structural schematic diagram of components of a communication device provided by an embodiment of the present disclosure.

FIG. 10 is a schematic structural diagram of a communication device 1000 provided by an embodiment of the present disclosure. In this embodiment, the communication device may be the terminal device or the network device. The communication device 1000 shown in FIG. 10 includes a processor 1010. The processor 1010 may invoke a computer program from a memory and run the computer program, to implement the method in the embodiments of the present disclosure.

Optionally, as shown in FIG. 10, the communication device 1000 may further include a memory 1020. The processor 1010 may invoke the computer program from the memory 1020 and run the computer program, to implement the method in the embodiments of the present disclosure.

The memory 1020 may be a component independent of the processor 1010, or may be integrated into the processor 1010.

Optionally, as shown in FIG. 10, the communication device 1000 may further include a transceiver 1030. The processor 1010 may control the transceiver 1030 to communicate with another device, and specifically, the transceiver 1030 may transmit information or data to another device, or receive information or data transmitted by another device.

The transceiver 1030 may include a transmitter and a receiver. The transceiver 1030 may further include an antenna. There may be one or more antennas.

Optionally, the communication device 1000 may be the network device in the embodiments of the present disclosure, and the communication device 1000 can implement corresponding procedures implemented by the network device in various methods in the embodiments of the present disclosure. For brevity, details are not described herein again.

Optionally, the communication device 1000 may be the terminal device or the network device in the embodiments of the present disclosure, and the communication device 1000 can implement corresponding procedures implemented by the mobile terminal/terminal device in various methods in the embodiments of the present disclosure. For brevity, details are not described herein again.

Figure 11:
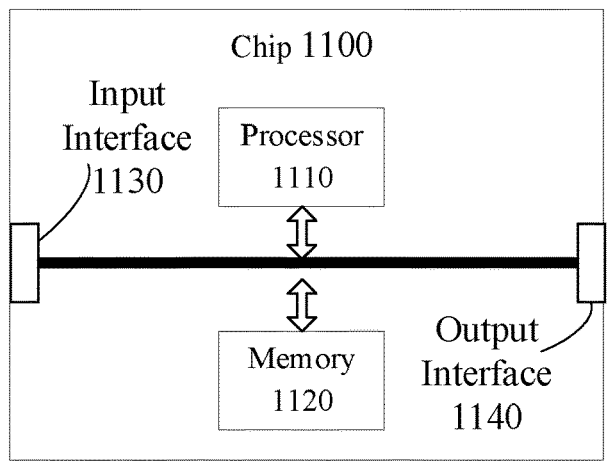
FIG. 11 is a schematic block diagram of a chip provided by an embodiment of the present disclosure.

FIG. 11 is a schematic structural diagram of a chip according to an embodiment of the present disclosure. The chip 1100 shown in FIG. 11 includes a processor 1110. The processor 1110 may invoke a computer program from a memory and run the computer program, to implement the method in the embodiments of the present disclosure.

Optionally, as shown in FIG. 11, the chip 1100 may further include a memory 1120. The processor 1110 may invoke the computer program from the memory 1120 and run the computer program, to implement the method in the embodiments of the present disclosure.

The memory 1120 may be a component independent of the processor 1110, or may be integrated into the processor 1110.

Optionally, the chip 1100 may further include an input interface 1130. The processor 1110 may control the input interface 1130 to communicate with another device or chip, and specifically, the input interface 1130 may obtain information or data transmitted by another device or chip.

Optionally, the chip 1100 may further include an output interface 1140. The processor 1110 may control the output interface 1140 to communicate with another device or chip, and specifically, the output interface 1140 may output information or data to another device or chip.

Optionally, the chip may be applied in the network device according to embodiments of the present disclosure, and the chip can implement corresponding procedures implemented by the network device in various methods in the embodiments of the present disclosure. For brevity, details are not described herein again.

Optionally, the chip may be applied to the terminal device in the embodiments of the present disclosure, and the chip can implement corresponding procedures implemented by the terminal device in various methods in the embodiments of the present disclosure. For brevity, details are not described herein again.

It should be noted that, the chip mentioned in the embodiments of the present disclosure may also be referred to as a system-level chip, a system chip, a chip system, a system on chip, or the like.

Figure 12:
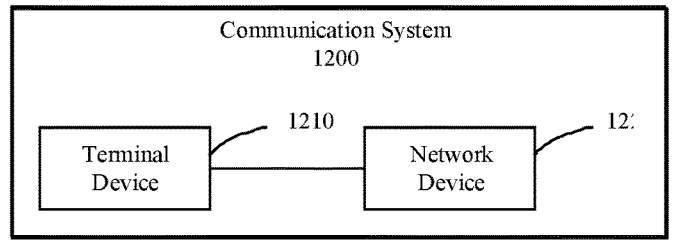
FIG. 12 is a second schematic diagram of a communication system architecture provided by an embodiment of the present disclosure.

FIG. 12 is a schematic structural diagram of a communication system 1200 according to an embodiment of the present disclosure. The communication system 1200 shown in FIG. 12 includes a terminal device 1210 and a network device 1220.

The terminal device 1210 can implement corresponding functions implemented by the terminal device in the foregoing method and the network device 1220 can implement corresponding functions implemented by the network device in the foregoing method. For brevity, details are not described herein again.

It should be understood that the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), and a direct rambus random access memory (DRRAM). It should be noted that, the memory of the system and the method described in this embodiment of the present disclosure is intended to include but is not limited to these memories and any other suitable type of memory.

It should be understood that the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the mobile terminal/terminal device in the embodiments of the present disclosure, and when run on a computer, the computer program instruction enables the computer to execute a corresponding procedure implemented by the mobile terminal/terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

What is claimed is:

1. A method for resource scheduling, applied to a first network device, comprising:
    obtaining first information; and
    determining at least one of a resource reservation or a resource scheduling of the first network device based on the first information,
    wherein the first information comprises an uplink/downlink indication configured to indicate whether a first service requires uplink or downlink transmission and at least one of a service cycle or a service arrival time point,
    wherein the determining at least one of a resource reservation or a resource scheduling of the first network device based on the first information comprises determining at least one of a resource reservation or a resource scheduling for a quality of service (QoS) flow bearing the first service in the first network device based on the first information, wherein the obtaining the first information comprises receiving the first information from a second network device, the first information is determined by the second network device based on second information received from a third network device or a terminal device, the first information comprises at least one of the following: the service cycle of the first service and a service type of the first service, and the second information comprises at least one of the following: a time window cycle, the service arrival time point, an available time-frequency resource, and continuous arrival time of data packet, and wherein the second network device is a core network device, and the first network device is a base station device.

2. The method according to claim 1, wherein the second information further comprises at least one of the following: a service transmission reserved time window length, an allowable error, a successful transmission duration of service, load information, a service change indication, a service priority indication, at least one of an allowable service identification or QoS parameter, at least one of a recommended service identification or QoS parameter, the service cycle, or a data packet size.

3. The method according to claim 1, wherein the first service is time sensitive network (TSN) service.

4. The method according to claim 1, further comprising:

configuring resource or dynamically scheduling resource transmission, by the first network device, according to at least one of service arrival time point or allowable error, service arrival time determined by successful transmission duration of service, or how long a data transmission need to be completed within a tolerance range.

5. The method according to claim 1, further comprising:

receiving the first information to the from the second network device when a preset condition is met.

6. The method according to claim 5, wherein the preset condition comprises:

a trigger condition is met, wherein, the trigger condition comprises one of the following: upon receiving second information, upon receiving third information, upon reporting capability information, upon a start or end of a service, upon a service model change, and upon a service priority change.

7. A second network device, comprising a processor and a memory, wherein the processor is configured to invoke a computer program from the memory and run the computer program, to perform:

receiving second information from a third network device or a terminal device;

determining first information based on the second information, wherein the first information comprises at least one of the following: a service cycle of the first service and a service type of the first service, and the second information comprises at least one of the following: a time window cycle, a service arrival time point, an available time-frequency resource, and continuous arrival time of data packet; and sending the first information to at least one of first network device, wherein the first information is used for determining at least one of a resource reservation or resource scheduling of the first network device, and the first information comprises an uplink/downlink indication configured to indicate whether a first service requires uplink or downlink transmission and at least one of the service cycle or the service arrival time point, wherein the first information is used for determining at least one of a resource reservation or resource scheduling for a QoS flow bearing the first service in the first network device, wherein the sending the first information to at least one of first network device comprises:

sending the first information to at least one of the first network device when a preset condition is met.

8. The second network device according to claim 7, wherein, the second information further comprises at least one of the following: a service transmission reserved time window length, allowable error, a successful transmission duration of service, load information, a service change indication, a service priority indication, at least one of an allowable service identification or QoS parameter, at least one of a recommended service identification or QoS parameter, the service cycle, or a data packet size.

9. The second network according to claim 7, wherein the processor is configured to perform:

sending the first information to the first network device when a preset condition is met.

10. The second network according to claim 9, wherein the preset condition comprises:

a trigger condition is met, wherein, the trigger condition comprises one of the following: upon receiving second information, upon receiving third information, upon reporting capability information, upon a start or end of a service, upon a service model change, and upon a service priority change.

11. A first network device, comprising a processor and a memory, wherein the processor is configured to invoke a computer program from the memory and run the computer program, to perform:

obtaining first information; and determining at least one of a resource reservation or a resource scheduling of the first network device based on the first information, wherein the first information comprises an uplink/downlink indication configured to indicate whether a first service requires uplink or downlink transmission and at least one of a service cycle or a service arrival time point wherein the determining at least one of a resource reservation or a resource scheduling of the first network device based on the first information comprises determining at least one of a resource reservation or a resource scheduling for a quality of service (QOS) flow bearing the first service in the first network device based on the first information, wherein the obtaining the first information comprises receiving the first information from a second network device, the first information is determined by the second network device based on second information received from a third network device or a terminal device, the first information comprises at least one of the following: the service cycle of the first service and a service type of the first service, and the second information comprises at least one of the following: a time window cycle, the service arrival time point, an available time-frequency resource, and continuous arrival time of data packet, and wherein the second network device is a core network device, and the first network device is a base station device.

12. The first network device according to claim 11, wherein the second information further comprises at least one of the following: a service transmission reserved time window length, an allowable error, a successful transmission duration of service, load information, a service change indication, a service priority indication, at least one of an allowable service identification or QoS parameter, at least one of a recommended service identification or QoS parameter, the service cycle, or a data packet size.

13. The first network device according to claim 11, wherein, the processor is further configured to:

configure resource or dynamically schedule resource transmission, according to at least one of service arrival time point or allowable error, service arrival time determined by successful transmission duration of service, or how long a data transmission need to be completed within a tolerance range.

14. The first network device according to claim 11, wherein the first service is time sensitive network (TSN) service.

15. The first network device according to claim 11, wherein, the processor is further configured to:

receive the first information to the from the second network device when a preset condition is met.

16. The first network device according to claim 15, wherein the preset condition comprises:

a trigger condition is met, wherein, the trigger condition comprises one of the following: upon receiving second information, upon receiving third information, upon reporting capability information, upon a start or end of a service, upon a service model change, and upon a service priority change.

* * * * *